April 29, 1958 — J. JOST — 2,832,163
FRAMES FOR TRANSPARENCIES
Filed April 24, 1953
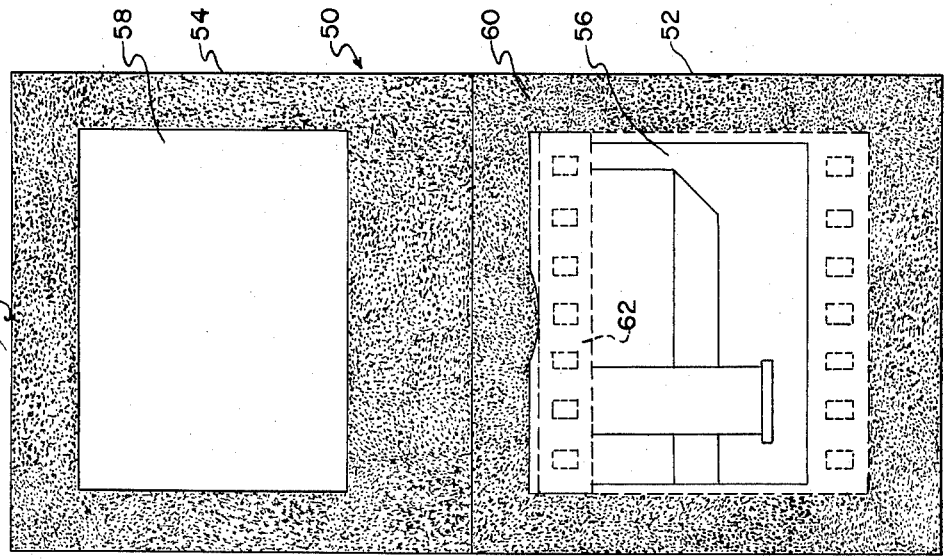
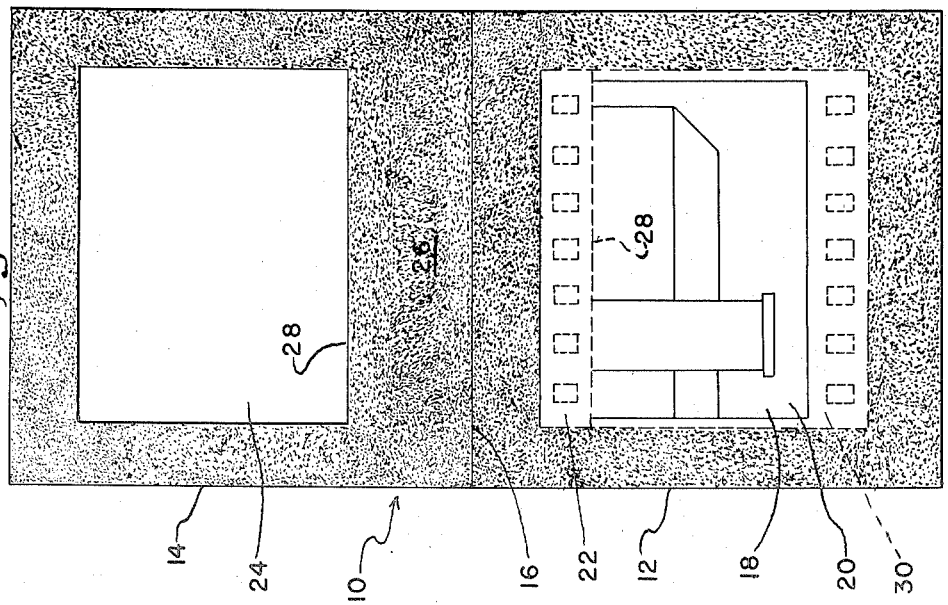
INVENTOR
JOHANNES JOST United States Patent Office 2,832,163
Patented Apr. 29, 1958

2,832,163

FRAMES FOR TRANSPARENCIES

Johannes Jost, Essen, Germany

Application April 24, 1953, Serial No. 350,804

Claims priority, application Germany April 26, 1952

2 Claims. (Cl. 40—158)

The present invention relates to frames for film sections; more particularly it concerns frames for transparencies adapted for use in projecting machines.

The object in framing film sections is to enclose and hold them dustproof in a secure position between two glass panes, and to cover the surrounding area of the image field proper with a mask thus rendering the surrounding area opaque.

This task has been solved by various means. Originally, the margin of the film section was pasted on to a mask, or notches were cut into the mask for the purpose of providing supporting flaps for the image section. As a result, however, the opaque mask frequently permitted disturbing light to enter at the notches into the projection, and the light could only be eliminated by the use of an additional mask combined on one margin by pinching or pasting so as to form double masks with two equally large apertures. This enclosure was placed between two glass panes and in one type of frames now obsolete the margins were taped all around with U-formed adhesive tape. Since then, this multipart enclosure was placed in special frames. Although in the first case practically completely dustproof frames were obtained with considerable effort, the dustproof quality could not be achieved when placing the enclosure within the frames, because a thickening in various places resulting from the unequal layer formation was inevitable. Consequently, dust from all four margins gained access into the image area and, due to the high magnification, became visible in a disturbing degree during the projection. In using such frames, the image field limitation was formed by a corresponding aperture in the rear or in the shutter so that the larger size aperture in the film support between the glass panes ceased to function as image limitation. Besides the fact that this type of frames proved to be expensive, a further important disadvantage of this arrangement was the accumulation of dust particles in the corners of the image field aperture during the dusting of the frames. These dust particles were difficult to remove and seriously impaired the projection.

Also known are frames in form of a paper strip coated on one side with adhesive and subdivided into three fields holding one equally large image aperture each. First, the image section is pasted onto the one margin serving as mask. Then both glass panes are wrapped in turn into the paper strip whereby a joining together of the strip with the glass panes is obtained through the moistened adhesive coating. Finally, that side of the pile, which so far remained open, is closed with a border flap. A wrapping operation of this type with a moistened adhesive tape requires considerable skill and, in addition, further allowances must be made for the thickness of the glass pane between the fields and the border flap. This treatment must depend from the start upon a certain thickness of the glass panes, because with larger thicknesses the apertures fail to register. Even so the three apertures will rarely register exactly. In most cases the result is an image field limitation deviating from the image rectangle, which shows to disadvantage in the projection. Furthermore, both glass panes are pasted with paper on the outside so that during the dusting of the glass panes the dust and dirt settles in the eight corners, and the edges of the apertures become rough, which again impairs the projection. Finally dust from the two free margins and between the two glass panes can also gain access to the image field area.

Also known is a frame for transparencies where a casette-like metal frame, whose shutter or rear wall contains the image field aperture, receives an enclosure consisting of two glass panes and a one-layer support for the film section located between them. This support with the thickness of film has an aperture large enough for the film section to be enclosed therein, which is aligned and brought into position solely by this measuring. The enclosure becomes here, therefore, a framed transparency ready for projection only by the additional frame effecting the image field limitation.

Finally known in this connection is a double mask with two apertures of equal size, which are furnished in the inner surfaces with a dry rubber cement, so that, after joining, all four margins of the enclosed film section are pasted down. This double mask is intended to serve by itself as a transparency frame. In this case the image is therefore not protected against dust and dirt. In order to give the image such protection, this double mask would have to be bound additionally on the margins by U-formed adhesive tapes or one of the customary cassette frames to form one single unit. However, even in this last mentioned case dust would penetrate into the bordering areas, since experience has shown the pressure of both glass panes against the mask alone to be insufficient to prevent dust from gradually gaining access into the image area proper, especially since the image section has a clearance of one half of the thickness of the mask in both directions.

The principal object of the invention is to provide a frame for film sections, which makes it economically possible to do without more expensive cassette frames, to offer maximum protection of the image area against dust penetration, to facilitate substantially the framing process itself, and to lower total expenses.

The object of the invention is accomplished by using a frame consisting of two half-frames, each of which is formed by a glass pane and a border of paper or similar material pasted previously thereon and having an open aperture. The smaller aperture forms the image field limitation, while the larger one encloses the film section and these borders are furnished with adhesive material, preferably dry rubber cement, on their free surface so that both half-frames can be joined together after the image section has been enclosed. Due to the fact that the borders are already pasted upon the glass panes during manufacture a maximum precision is achieved, so that the rectangular form of the image aperture is ensured, but the framing operation is also instantly and easily carried out in the correct position against the image aperture by using the adhesive layer on the border functioning as mask. The use of two such borders, which together should be measured somewhat thicker than the film sections, is at the same time intended for the purpose of obviating pressing of the film against the glass panes which would cause the formation of Newton's rings. The borders of paper or a similar suitable material pasted upon the glass panes offer the guarantee that the glass panes do not break even if the glass frame is dropped.

The joining of the two half-frames thus prepared by folding together, is facilitated when both borders are cut from a single sheet like a double mask and then bent in the lateral center. This fold acts as guidance for the folding together, so that both halves register exactly upon each other. It also has the technical advantage of facilitating the pasting on to the two glasses.

The margins of the glasses may be rounded off by grinding.

A frame prepared in this manner is ready for projection, i. e. independent of any special metal framing, and does not possess any corners where dirt can accumulate.

It has been further found that it is advantageous for the user to have some form of guide when inserting and sticking down the film section on to the adhesive coating of the border which forms the mask, which enables him to place the image in the exact centre of the image field limitation aperture without the help of a light-colored or illuminated mounting base. As the adhesive coating is already sticky when the film section is applied, the film section (in the case of the transparency frames discussed above) adheres all round as soon as it is laid down flat in the first place. It is, for this reason, often difficult to shift the section to bring the image into exact alignment with the border in cases, for instance, where the picture has been taken at an angle. The smooth border strip itself has no such orientation point recognizable by touch, which could serve as a stop for the edge of the film section, since an orientation point of this kind projecting upwards would, unless special precautions were taken, break through the light-tight border strip, increase at this point the clearance of two layers' thickness between the glass panes joined together and thus prejudice their dust-proofness.

Another feature of the invention consists in the fact that a visible or palpable marking is provided as an orientation point for the attachment of the film section on to the border surrounding the image limitation aperture, in the clearance of the lateral folding edge in which the margin of the film section is to be placed. This guiding mark may take various forms, for example that of a visible line scratched or printed on to the adhesive coating of a predominantly dark hue, of a pasted-on thread or thin strip of paper or, finally, the form of a small slot-like perforation which need not necessarily be as long as the film section but which may preferably be even longer. In this manner the user is presented, when adjusting the image, with a guiding line which is at least visible, or better still with a palpable guide point in the form of a conducting knob for the co-centric insertion of the film section.

A preferred embodiment of this invention comprises an extension of the width of the image field aperture on a level with the image field limitation line facing the folding edge at least for the entire length of the film section, while this aperture is prolonged in the same direction up to the margin of the film section inserted. At the same time this limitation line is formed by the margin of the larger aperture which has been correspondingly brought forward. In this manner, also, the user obtains, on the rear edge of the widened portion of the aperture (which is free from adhesive matter), an adjusting edge for the image section. This is now held by its rear margin only and as soon as it has been adjusted, without interference from the adhesive, into alignment with the left and right-hand margin of this narrow space, it is allowed to fall into place on the border and the margin is pressed at this point against the adhesive surface. When closing the other half-frame by turning it through 180° the margin of the larger aperture of this part of the cover, which was brought forward, reaches the area of increased width, exactly registers with the film at this point and closes the still open portion of image field limitation.

If the aperture is larger in all directions than the length and breadth of the film it is nevertheless still possible to arrange the adjusting edge in the prescribed position. It may, however, also be correspondingly transposed in an outward direction as long as a projection is placed somewhere near the middle to serve as a conducting knob. This contrivance is also suitable for images taken at an angle, particularly so because the image section, with the assistance of this conducting knob acting as a stop, may be tilted correspondingly in the direction required.

The invention is illustrated by way of example in the following drawing in which;

Fig. 1 is a top plan view, in open condition, of a device embodying the present invention, and Fig. 2 is a view similar to Fig. 1 of a modified form of the invention.

There is shown in Fig. 1 a frame device, generally designated 10, comprising a first opaque section 12 and a second opaque section 14 integrally connected to each other by a fold line 16 whereby the two sections may be overfolded upon each other when required.

The section 12 contains an aperture 18 which consists of a major portion 20 and a minor portion 22. The major portion 20 is somewhat narrower than the minor portion so that the general shape of the entire aperture 18 is somewhat T-shaped. The entire aperture is covered with a transparent plate of glass or the like.

The section 14 is also provided with an aperture illustrated at 24. This aperture 24 is also covered with a transparent plate and is generally rectangular in shape and has a width corresponding to the width of the major portion 22 of aperture 18. However, the aperture 24 is so arranged that it leaves an opaque border 26 adjacent the fold line 16 which, when the two sections 12 and 14 are overfolded, overlies the widened aperture portion 22 so that the edge 28 of aperture 24 forms the upper edge of the resulting aperture, as indicated in dotted outline in Fig. 1.

The borders around the apertures 18 and 24 on their respective sections 12 and 14 are coated with a suitable adhesive; however, prior to use, a suitable protective cover or mask, not shown, is applied over the adhesive-coated border areas to prevent premature adhesion of the sections.

In use, the film device 10 is opened up into the position of Fig. 1, the protective mask is removed, and a portion of film 30 is applied to section 12 of the frame device. The film is applied over the aperture 18 and aligned into the proper position. During this alignment, the upper edge of aperture portion 22 acts as a guide means for the upper edge of the film. When properly in position, the side edges of the film overlap the side edges of the aperture portion 20. The adjustment is properly made by the user securing the perforated margin of the film 30 with the fingers of his left hand while bringing an image taken at an angle into alignment with the three edges of the aperture. If the image is a tilted one, the previously determined degree of the image's tilt will be quite sufficient for anyone who has had any experience with this type of alignment. After the alignment is completed, the rear portion of the film is allowed to fall onto the adhesive-coated borders of the frame and the margins of the film are then pressed against these adhesive-coated borders to hold the film firmly in position.

The section 14, with the protective mask removed therefrom, is then overfolded onto the section 12 which has the film held securely thereon, so that the aperture 24 overlies the image area of the film. Pressure is then applied to secure the margins around the front face of the film to the adhesive coated borders of the section 14. During this step, the border portion 26 of section 14 acts to press the upper perforated portion of the film into the aperture portion 22. The slight buckling of the film which takes place in this manner has the advantageous effect of stiffening the film which might otherwise tend to curl up, while, at the same time, the pressure is not sufficient against the glass in the aperture to form Newton's rings. Furthermore, since the margins of the film are pressed against flat surfaces on both faces, they are maintained in a flat and level condition. In addition, the provision of two apertures of different dimensions whereby one partly overlies the other results in a clean-cut edge which cannot always be achieved by punching since the angular knives used in punching must be in continual contact in order to accomplish such clean edge. As is well known, this can be accomplished mechanically only with the greatest difficulty.

In Fig. 2 there is shown a modification of the frame device wherein the frame device 50 comprises the two sections 52 and 54 each having its respective aperture indicated at 56 and 58. These apertures 56 and 58 are substantially similar to aperture 18 and 24 except that the upper or minor portion 60 of aperture 56 is extended somewhat toward the fold line and its upper edge is provided with a centrally positioned, rounded knob or projection 62 which extends downwardly into the area of the aperture portion 60. This projection 62 serves as an auxiliary guide means around which the upper edge of the film can be swivelled during adjustment into the desired position.

Obviously many modifications and variations of the present invention are possible in the light of the above teachings. It is, therefore, to be understood that within the scope of the appended claims the invention may be practiced otherwise than as specifically described.

I claim:

1. A frame device for transparencies comprising a pair of frame members, each of said frame members comprising a transparent plate on one surface of which is bonded an opaque frame encompassing an aperture, the apertures of said opaque frames being arranged to register with each other when said frame members are arranged in overlying relationship to each other, each of said opaque frames being part of an integral sheet having a hinge portion therebetween, said hinge portion being positioned between corresponding edges of said transparent plates so that said frame members may be hingedly overfolded into said overlying relationship, an adhesive-free guide means on at least one of said opaque frames, said guide means being adapted to position a transparency in relationship to said frame members, said opaque frames being each provided with an adhesive coating on those surfaces which are in face-to-face relationship when said frame members are in overlying relationship, said adhesive coating extending to opposed margins of the corresponding aperture so that said opaque frames may adhesively clamp opposed marginal portions of the transparency therebetween when said transparency is in place and said opaque frames are overfolded upon one another, one of said apertures being generally T-shaped and having a major portion of a size and shape corresponding to the image field of the transparency and a minor portion which extends beyond the lateral edges of the major portion to form the upper part of the T-shape, the upper edge of said minor portion forming said guide means, and the other of said apertures having a portion which corresponds to the size and shape of the transparency.

2. The device of claim 1 wherein a central projection extends inwardly from the upper edge of said minor portion to act as a supplemental guide for the transparency.

References Cited in the file of this patent
UNITED STATES PATENTS

| | | |
|---|---|---|
| 1,261,133 | Kidd | Apr. 2, 1918 |
| 1,467,108 | Hodgson | Sept. 4, 1923 |
| 2,014,743 | Metzler | Sept. 17, 1935 |
| 2,127,940 | Rinn | Aug. 23, 1938 |
| 2,184,007 | Staehle | Dec. 19, 1939 |
| 2,268,529 | Stiles | Dec. 30, 1941 |
| 2,291,173 | Simpson | July 28, 1942 |
| 2,495,142 | Seary | Jan. 17, 1950 |
| 2,504,332 | Horwitt | Apr. 18, 1950 |
| 2,505,250 | Kime | Apr. 25, 1950 |
| 2,656,631 | Cadwell | Oct. 27, 1953 |
| 2,701,426 | Vlock | Feb. 8, 1955 |
| 2,739,401 | Bolter | Mar. 27, 1956 |